US009544278B2

(12) United States Patent
Hozza et al.

(10) Patent No.: US 9,544,278 B2
(45) Date of Patent: Jan. 10, 2017

(54) USING DOMAIN NAME SYSTEM SECURITY EXTENSIONS IN A MIXED-MODE ENVIRONMENT

(71) Applicant: Red Hat, Inc., Raleigh, NC (US)

(72) Inventors: Tomas Hozza, Lubica (SK); Petr Spacek, Brno (CZ); Miloslav Trmac, Brno (CZ); Prasad J. Pandit, Pune (IN); Pavel Simerda, Prague (SK); Florian Weimer, Stuttgart (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/591,121

(22) Filed: Jan. 7, 2015

(65) Prior Publication Data

US 2016/0197898 A1    Jul. 7, 2016

(51) Int. Cl.
*G06F 7/04* (2006.01)
*H04L 29/06* (2006.01)
*H04L 29/12* (2006.01)

(52) U.S. Cl.
CPC ....... *H04L 63/0442* (2013.01); *H04L 61/1511* (2013.01); *H04L 63/00* (2013.01); *H04L 61/303* (2013.01)

(58) Field of Classification Search
CPC ...................................................... G06F 21/33
USPC ...................................................... 726/2–10
See application file for complete search history.

(56) References Cited

U.S. PATENT DOCUMENTS

| 8,645,700 | B2 | 2/2014 | Smith et al. |
| 8,681,995 | B2 | 3/2014 | Seshadri et al. |
| 2004/0249975 | A1* | 12/2004 | Tuck ................. H04L 29/12066 709/245 |
| 2008/0260160 | A1* | 10/2008 | Moreau ............ H04L 29/12066 380/277 |

(Continued)

OTHER PUBLICATIONS

Radha et al., "DEEPAV2: A DNS monitor tool for prevention of public IP DNS rebinding attack," Advances in Recent Technologies in Communication and Computing (ARTCom 2011), 3rd International Conference on Year: 2011 pp. 72-77.*
Korhonen et al., "Toward network controlled IP traffic offloading," IEEE Communications Magazine Year: 2013, vol. 51, Issue: 3 pp. 96-102.*
"Example: Configuring Secure Domains and Trusted Keys for DNSSEC", Juniper Networks, Nov. 7, 2013 2 pages http://www.juniper.net/techpubs/en_US/junos12.1x46/topics/example/secure-domains-trusted-keys-dnssec-configuration.html.

(Continued)

*Primary Examiner* — Roderick Tolentino
(74) *Attorney, Agent, or Firm* — Lowenstein Sandler LLP

(57) ABSTRACT

A method relates to generating, by a processing device executing a DNS resolver, a first domain name system (DNS) query comprising a DNS request generated from an application executing on the processing device to query a first DNS server serving a first DNS zone connected to the processing device via a public network, receiving, from the first DNS server, a first resource record comprising a DNS answer to the DNS query, a second resource record comprising a digital signature generated by signing the DNS answer with a first private key of the first DNS zone, a third resource record comprising a first public key for verifying the digital signature, and one or more files for validating a chain of trust of the first public key, determining, by the processing device in view of the one or more files, that the chain of trust of the first public key misses at least one of a trust anchor or a link in the chain of trust, and generating a second DNS query comprising the DNS request to query a second DNS server residing in a private network of the processing device.

20 Claims, 4 Drawing Sheets

(56) References Cited

U.S. PATENT DOCUMENTS

| | | | | |
|---|---|---|---|---|
| 2010/0095337 | A1* | 4/2010 | Dua | H04L 29/06027 725/110 |
| 2012/0117621 | A1 | 5/2012 | Kondamuru et al. | |
| 2012/0124369 | A1* | 5/2012 | Amenedo | H04L 63/0823 713/156 |
| 2012/0284505 | A1 | 11/2012 | Smith et al. | |
| 2013/0036307 | A1 | 2/2013 | Gagliano et al. | |
| 2013/0145011 | A1* | 6/2013 | Hyatt | H04L 9/00 709/223 |
| 2013/0291101 | A1 | 10/2013 | Karasaridis | |
| 2013/0326599 | A1* | 12/2013 | Bray | H04L 61/1511 726/6 |
| 2014/0244730 | A1* | 8/2014 | Wyatt | H04L 61/1511 709/203 |
| 2014/0282847 | A1* | 9/2014 | Blacka | H04L 61/1511 726/1 |
| 2014/0304414 | A1* | 10/2014 | Yengalasetti | H04L 67/1036 709/226 |
| 2015/0326438 | A1* | 11/2015 | Mowry | H04L 41/12 709/222 |

OTHER PUBLICATIONS

"DNS Servers", microsoft.com, Feb. 11, 2014, 10 pages http://technet.microsoft.com/en-us/library/dn593674.aspx.

Bellis, Ray et al. "Test Report: DNSSEC Impact on Broadband Routers and Firewalls", Core Competence, Sep. 2008, 23 pages http://download.nominet.org.uk/ddnssec-cpe/DNSSEC-CPE-Report.pdf.

Huston, Geoff "Measuring DNSSEC Use", APNIC Labs, Aug. 20-30, 2013, 57 pages https://www.google.co.in/url?sa=t&rct=j&q=&esrc=s&source=web&cd=1&cad=rja&uact=8&ved=0CC0QFjAA&url=http%3A%2F%2Flabs.apnic.net%2Fpresentations%2Fstore%2F2013-08-27-dnssec-apnic.pptx& ei=aOWhU6e-FMiwuASRrlD4CA&usg=AFQjCNEIhmtZjeAIVL60Je326X8Bq_EWg.

Arends, R. et al. "DNS Security Introduction and Requirements", RFC 4033, Standards Track, Mar. 2005, pp. 1-21.

Hopkins, Allie et al. "Helping Secure the Internet with DNSSEC", educause.edu, Sep. 22, 2010, 5 pages http://www.educause.edu/ero/article/helping-secure-internet-dnssec.

* cited by examiner

USING DOMAIN NAME SYSTEM SECURITY EXTENSIONS IN A MIXED-MODE ENVIRONMENT

TECHNICAL FIELD

This disclosure relates to a domain name system (DNS) and, in particular, to securely using Domain Name System Security Extensions (DNSSEC) in mix-mode environments.

BACKGROUND

A domain name system (DNS) is a naming system for computing devices or any resources connected to the Internet or a private network. The domain name system may translate an easy-to-remember domain name into a numerical IP address that can be recognized by a network device in order to locate resources on the Internet. For example, if a computing device receives a request by a web browser for the IP address of a domain name entered as part of a uniform resource locator (URL), a DNS resolver—a hardware or software component associated with the computer which determines the domain name servers responsible for mapping the domain name to an IP address through queries (referred to as "DNS queries" hereinafter), may send a DNS query including the domain name to a DNS server chosen by the administrator of the computing device (or client computing device). The DNS server may keep resource records of domain names and IP addresses from which the DNS server may determine the IP address for the domain name and then reply to the computing device with a DNS answer including the IP address or other type of data stored in a DNS database.

BRIEF DESCRIPTION OF THE DRAWINGS

The present disclosure is illustrated by way of example, and not by way of limitation, in the figures of the accompanying drawings.

DETAILED DESCRIPTION

Figure 1:
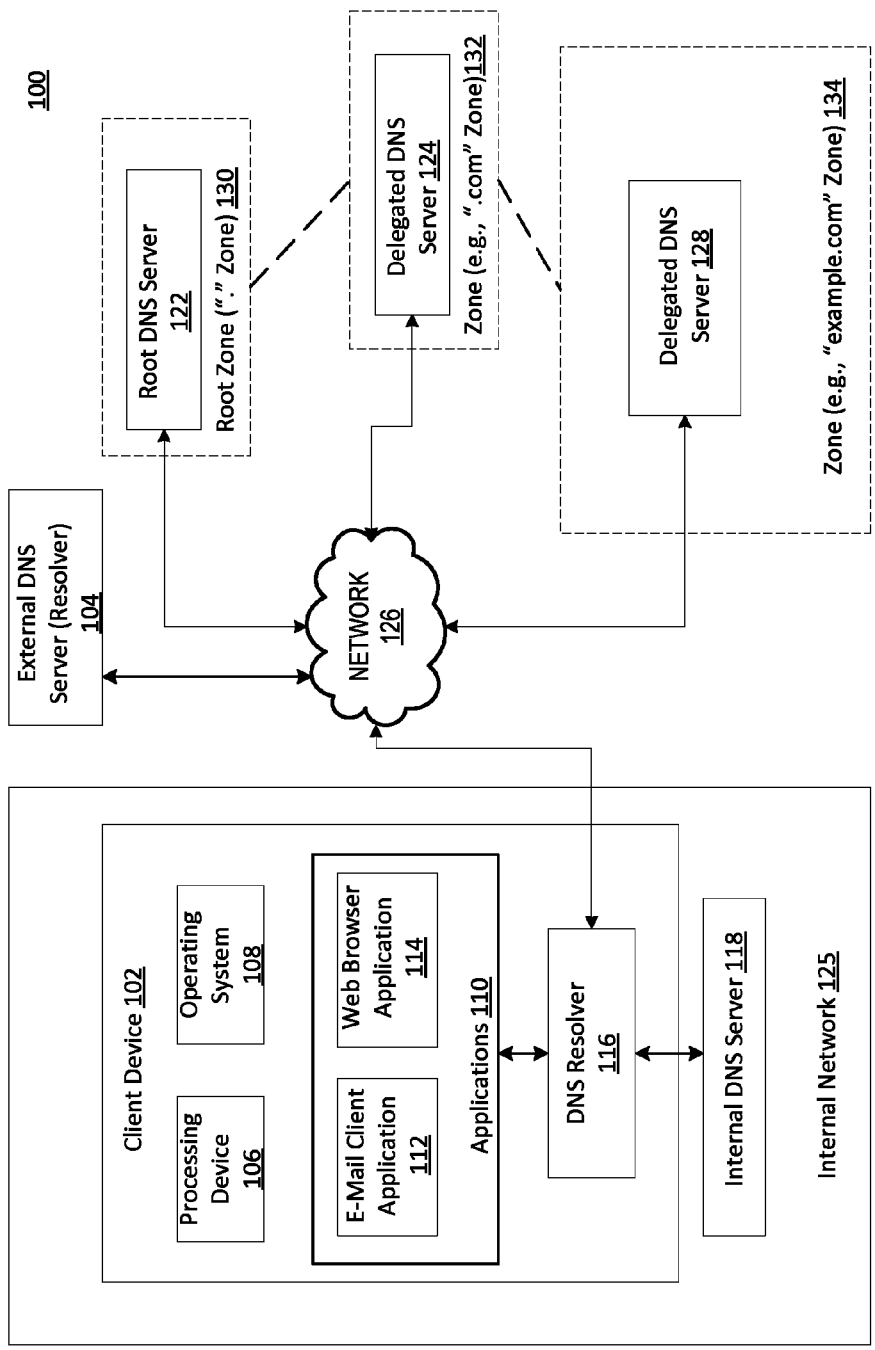
FIG. 1 illustrates an exemplary system to provide DNS services according to an implementation of the present disclosure.

The DNS queries and DNS answers are often transmitted without security measures, thereby subjecting the DNS queries and DNS answers to the threat of attacks such as spoofing attacks. In spoofing attacks, an attacker in the middle may send forged DNS answers to the requesting DNS resolver. To prevent threats to the DNS queries and DNS answers, the Internet Engineering Task Force (IETF) specified the Domain Name System Security Extensions (DNSSEC)—a set of extensions to DNS which provide the DNS resolver on the client device with capability to authenticate the origin of DNS answers in order to ensure that the DNS answers received by the DNS resolver are authoritative. All answers from DNS servers in a DNSSEC protected zone are digitally signed with a digital signature. By verifying the digital signature, the DNS resolver on the client device is able to determine data received from the DNS server are identical to that published by the zone owner and served by the DNS servers in the zone.

While the DNSSEC may provide security measures to the communication between DNS resolvers on a client device and DNS servers, the deployment of DNSSEC is not universal. In certain instances, during the process of recursively determining the IP address of the domain name, some of the DNS servers are implemented with DNSSEC and some are not. Therefore, a DNS resolver may operate in a mixed environment, in which the DNS resolver sometimes interacts with DNS servers with DNSSEC capability and sometimes with DNS servers without DNSSEC capability.

The domain names in the domain name system are commonly organized hierarchically in a tree-like structure, and the DNS query for an IP address of a domain name or other type of data stored in a DNS database may be accomplished recursively via a series of DNS servers in the domain name system. A domain name may include a concatenation of parts (or labels) that are separated by a dot. Under a root zone, the right-most label of a domain name corresponds to the top-level domain, and the hierarchy of domains descends from right to left, each label representing a subdivision or subdomain to the one on the right. For example, a domain name of www.example-organization.organizations.org may include a top-level public domain of .org and subdomains of organizations.org and example-organization.organizations.org. The root domain may be represented by the empty string to the right of .org so that the hierarchy is the root domain (" ")→".org"→"organiziations.org"→"example-organization.organizations.org" etc.

All the domain names on the Internet may form a domain name space in which the domain names are organized hierarchically in a tree-type data structure. Further, the domain name tree may be partitioned into zones with a root zone at the top of the domain name tree. A root zone may be served by one or more root DNS servers that are authoritative. Zones below the root zone in the domain name space may include domains and subdomains that may also be organized hierarchically as sub-trees of the domain name tree. Each zone may be served by one or more DNS servers that may provide DNS answers to DNS queries from DNS resolvers. In response to a DNS query from a DNS resolver, the DNS server may provide a direct DNS answer that resolves the DNS query. For example, the resource records associated with a DNS zone served by the DNS server may allow the DNS server to respond with an IP address or other type of data stored in a DNS database for the requested domain name. Alternatively, if the DNS server does not have the information, the DNS server may provide information of a delegated DNS server to the DNS resolver so that the DNS resolver may generate another DNS query to the delegated DNS server. In this way, a DNS query may be resolved through a series of DNS queries and DNS answers via a number of DNS servers serving a number of DNS zones.

In the mixed environment where DNS servers with DNSSEC capability and DNS servers without DNSSEC capability co-exist in different DNS zones within the DNS hierarchy of the domain name space, a DNS resolver associated with a client device may need to deal with two sets of conflicting requirements of DNS servers. For example, a mobile computing device may be connectable to various different network environments. For example, the mobile computing device may be in a DNSSEC-enabled zone, in which a security-aware DNS resolver of the mobile computing device validates DNS answers from DNS servers in the DNSSEC-enabled zone. Moreover, the mobile computing device may also be capable of connecting in a hostile environment, in which the default DNS server does not provide DNSSEC answers to the DNS resolver of the mobile computing device. For example, a DNS server may be configured to simply disregard the DNSSEC signature in the DNS answer to the DNS resolver. Another issue that the DNS resolver faces is that certain domain names are private to the local network (e.g., domains within a company network) of the DNS resolver. These private domain names may not be visible to devices outside the local network in the public network (e.g., the Internet). These private domain names may be resolved using internal DNS servers that reside within the local network. However, the internal DNS servers are often not configured to support DNSSEC.

One way to deal with a mixed environment is to configure a security-aware (or DNSSEC-validating) DNS resolver to use the external DNSSEC-enabled DNS servers by default and to configure specific overrides and exceptions for those domains whose records are with internal DNS servers or non-DNSSEC DNS servers. However, this approach is not fully secured because there is no reliable way to determine which domain to override. The generally available source of domain names for the current network is in the domain search list returned in a DHCP (Dynamic Host Configuration Protocol) reply which is not authenticated, therefore vulnerable to spoofing. Because of this, a malicious network may cause the DNS resolver to add an override or exception for any domain, therefore defeating the DNSSEC protection for that domain.

Implementations of the present disclosure relate to a method including generating, by a processing device executing a DNS resolver, a first domain name system (DNS) query comprising a DNS request generated from an application executing on the processing device to query a first DNS server serving a first DNS zone connected to the processing device via a public network, receiving, from the first DNS server, a first resource record comprising a DNS answer to the DNS query, a second resource record comprising a digital signature generated by signing the DNS answer with a first private key of the first DNS zone, a third resource record comprising a first public key for verifying the digital signature, and one or more files for validating a chain of trust of the first public key, determining, by the processing device in view of the one or more files, that the chain of trust of the first public key misses a trust anchor or a link in the chain of trust, and generating a second DNS query comprising the DNS request to query a second DNS server residing in a private network of the processing device. A missing link may be determined by cryptographically signed proof (e.g., a digitally signed file) to indicate that there is no public key for a delegated DNS zone.

Implementations of the present disclosure include a system having a memory and a processing device coupled to the memory to generate, by the processing device executing a DNS resolver, a first domain name system (DNS) query comprising a DNS request generated from an application executing on the processing device to query a first DNS server serving a first DNS zone connected to the processing device via a public network, receive, from the first DNS server, a first resource record comprising a DNS answer to the DNS query, a second resource record comprising a digital signature generated by signing the DNS answer with a first private key of the first DNS zone, a third resource record comprising a first public key for verifying the digital signature, and one or more files for validating a chain of trust of the first public key, determine, by the processing device in view of the one or more files, that the chain of trust of the first public key misses a trust anchor or a link in the chain of trust, and generate a second DNS query comprising the DNS request to query a second DNS server residing in a private network of the processing device. A missing link may be determined by cryptographically signed proof (e.g., a digitally signed file) to indicate that there is no public key for a delegated DNS zone.

Implementations of the present disclosure address the issue relating to securing the interactions between a DNS resolver of a client device and DNS servers in a mixed environment including DNS servers with DNSSEC support and without DNSSEC support. According to implementations of the present disclosure, the DNS resolver treat a sub-tree of domains in a zone including both public and private DNS domains as if either all the domains in the sub-tree are protected with DNSSEC signatures or none of them are protected with DNSSEC signatures.

Implementation of the present disclosure may include providing an internal DNS server to a client device. The internal DNS server may be configured by an administrator of the local network so that the internal DNS server may be accessed by the client device, but may not be accessed by devices external to the local network. Further, the client device may also have access to an external DNS server that can be accessed by the client devices and devices external to the local network.

Implementations of the present disclosure may include a security-aware DNS resolver that may verify DNSSEC signatures. The DNS resolver may generate a DNS query to an external DNS server and receive DNS resource records from the external DNS server in return. The DNS resource records may be signed with a zone signing private key. The DNS resolver may verify the DNS signatures using a zone signing public key to determine whether to use the external DNS server for the DNS answer or to query an internal DNS server for the DNS answer.

FIG. 1 illustrates a system 100 to provide DNS services according to an implementation of the present disclosure. Referring to FIG. 1, the system 100 may include a client device 102 residing in an internal network 125. The client device 102 may communicate with an external DNS server 104 via the internal network 125 and a public network 126. The DNS resolver 116 may be configured by the administrator of the client device 102 to provide domain naming service to the client device 102 via the internal network 125 and the public network 126. The client device 102 may be any computing device capable of connecting to the external DNS server 104 via the internal network 125 and the public network 126. For example, the client device 102 may be a desktop computer, a mobile computer, or any device that is connected to the public network 126 and requires domain naming services from an external DNS server (e.g., external DNS resolver 104, or external authoritative DNS servers 122, 124, 128) external to a local network of the client device 102.

External DNS servers 122, 124, 128 may be part of a DNS hierarchy including multiple DNS zones such as DNS zones 132, 134, and a root DNS zone 130 through which the IP address of the authoritative DNS server for a domain name may be resolved recursively. At the top of the DNS hierarchy may be a root zone 130 including a root DNS server 122 which is authoritative in the sense that the root DNS server 122 may have the information to determine the IP address of a domain name within zones under the root DNS zone 130. For example, the root DNS server 122 may have the information of the names and IP addresses of DNS servers responsible for top-level domains (such as .com, .org, .net etc.) or may have the information of the DNS server that have the names and IP addresses and other types of data other than the IP addresses.

Under the root DNS zone 130, the DNS zones are organized hierarchically (e.g., in a tree-type structure). For example the DNS hierarchy as shown in FIG. 1 includes the root DNS zone 130 with a branch to the DNS zone 132 (the .com zone) with a branch to the DNS zone 134 (the example.com zone). The DNS server serving a higher level DNS zone may delegate tasks to a sub-domain of a lower-level DNS zone, including seeking answer to a DNS query and retrieving a key for verifying a signed data. For example, the root DNS server 122 serving the root zone 130 may delegate work to DNS server 132 serving zone 134. Each DNS zone may include one or more external DNS servers.

In an implementation, the client device 102 includes a processing device 106 (such as a central processing unit (CPU)) that may execute an operating system 108 that manages the computing resources of the client device 102. For example, the operating system 108 may schedule the execution of one or more applications 110 on the processing device 106. In an implementation, the applications 110 access remote resources identified in part by domain names over the public network 126. For example, an e-mail client application 112 may receive a request to send an e-mail to a user at a certain e-mail address associated with a domain name, and a web browser application 114 may receive a request to browse a web page URL (Uniform Resource Locator) including another domain name. Under both scenarios, the execution of the corresponding application may need to map a domain name to an IP address or other type of data stored in a DNS database.

In one implementation, the client device 102 may include a DNS resolver 116 to facilitate the resolution of domain names. In an implementation, the DNS resolver 116 may send out DNS queries to an external DNS server (e.g., a DNS server configured to the client device 102) via the internal network 125 and the public network 126, and determine the IP address in view of the DNS answers received from the external DNS servers. In one implementation, the client device 102 may also have access to an internal DNS server 118 (residing on the internal network 125) which may be installed by a system administrator on the client device 102. The IP address of the internal DNS server 118 may be obtained using the DHCP protocol from the local network. The internal DNS server 118 may include records of domain names and their corresponding IP addresses. The internal DNS server 118 is in a private network that is accessible by client devices in the local network designated by the system administrator. The internal DNS server 118 is not accessible by external devices through public network 126. For example, a system administrator of a company may specify an internal DNS server 118 to client devices on its private network (e.g., the company's intranet).

In one implementation, the DNS resolver 116 may also have access to one or more external (or public) DNS servers such as 104, 122, 124, 128 over the public network 126 to send DNS queries for resolving the IP address of a domain name. Although the client device 102 may have an internal DNS server 118 residing in the internal network 125, it may still be desirable for the DNS resolver 116 to have access to the external DNS servers because the external DNS servers support DNSSEC and the internal DNS server does not support DNSSEC.

In an implementation, one of the external DNS servers may be designated as the default external DNS server that the client device 102 inquires first. For example, as shown in FIG. 1, the external DNS server 104 is the default external server. Other external DNS servers (e.g., external DNS server 122, 124, 128) are external DNS servers which may be used by the external DNS server 104 for the answer of a DNS query. These external DNS servers may be organized according to a tree structure. At the top of the tree may be a root DNS server 122 serving a root DNS zone 130 of the domain name system. The root DNS server 122 is authoritative. In one implementation, the root DNS server 122 may be trusted because the root DNS server (and DNS resolver 116) may have cryptographic keys to establish the chain of trust. However, since the root DNS server 122 is at the top of the DNS server hierarchy that serves many client devices, the root DNS server 122 may not be the first resource to look for the answer to a DNS query in order to reduce the burden on the root DNS server 122.

The external DNS servers may be an authoritative server (i.e., having the answer) or a recursive server (i.e., knowing which DNS server may have the answer) through which the DNS query may be resolved recursively. For example, the external DNS server 104 may include a recursive DNS server. In an implementation, the external DNS server 104 as a default external DNS server to the client device 102 may receive a DNS query from the DNS resolver 116 of the client device 102 (e.g., to determine the IP address of the requested domain name or other type of data stored in a DNS database, or to retrieve a key associated with the DNS zone served by DNS server 104). The recursive DNS server 104 may look up resource records associated with DNS zones (e.g., 130, 132, 134) to determine if the recursive DNS server 104 is able to resolve the query. If the recursive DNS resolver of the DNS server 104 is able to, the external DNS server 104 may send an answer including the requested information to the resolver 116 of the client device. In one implementation, the DNS resolver 116 may query the root DNS server 122 for the DNS answer. The root DNS server 122 may include an authoritative name server. In response to receiving the DNS query, the authoritative name server of the root DNS server 122 may have the answer (such as an IP address to a domain name) or have the name (or address) of a DNS server that has the answer to the DNS query. The root DNS server 122 may send a resource record including the DNS answer or information of the DNS server that has the answer to the DNS resolver 116. For example, if the root DNS server 122 indicates that DNS server 124 may have the answer, the DNS resolver 116 may query the DNS server 124 so that that an authoritative name server of the DNS server 124 may resolve the query for the DNS resolver 116. In this way, a DNS query may be resolved recursively.

In an implementation, a DNS server may serve a DNSSEC-enabled DNS zone that has a private key to digitally sign resource records transmitted from the DNS server serving the zone to DNS resolvers. For example, in an implementation, the external DNS servers (e.g., 122, 124, 128) may serve a DNSSEC-enabled DNS zone and digitally signs any resource records in the DNS answers with a private key of the DNS zone. In an implementation, the external DNS servers (e.g., 122, 124, 128) may also have a public key (to form a key pair with the private key) that may be used to verify the digital signatures of the resource records. The external DNS servers (e.g., 122, 124, 128) may then transmit resource records containing the DNS answer, the digital signatures of the DNS answer, and the public key to the DNS resolver 116.

The DNS resolver 116 may receive the DNS answer, the digital signature, and the public key, and verify the digital signature using the public key to validate whether the received resource records containing the DNS answer may be authenticated with the digital signatures. If the DNS resolver 116 determines that the digital signatures match the answer, the DNS resolver 116 successfully authenticates the DNS answer. However, if the DNS resolver 116 determines that the signatures of the received resource record do not match the DNS answer, the DNS resolver 116 may deem that the signature is bogus.

The public key received from the external DNS server 104 may also need to be validated. The validation includes that the public key is obtained through a chain of trust besides validating the DNS answer. In one implementation, the validation of the chain of trust may occur concurrently with the authentication of the answer. The security-aware DNS resolver 116 may learn the zone's public key either by having a trust anchor to store the public key obtained via certain secure or trusted means outside the DNS protocol or by a process of normal DNS resolution. To determine whether the public key learned via the DNS resolution is trusted, the DNS resolver 116 may trace the targeted public key through trusted links to an eventual trust anchor.

In one implementation, the chain of trust may be established by checking a chain of trust from a trust anchor (e.g., keys in the root DNS zone) to the leaf DNS zones. For example, the Internet Assigned Number Authority (IANA)) may provide a key signing key (KSK) pair including a root KSK public key to establish a trust anchor. The root KSK public key is published while the root KSK private key is not. The root KSK private key may be used to sign a resource record containing a root ZSK key pair including a root zone signing key (ZSK) public key and a root ZSK private key. Similarly, the root ZSK public key is published while the root ZSK private key is not. The root ZSK private key may be securely stored in the root zone to sign resource records of the root zone. The security of the root ZSK public key is obtained by the signing using the root KSK private key. In the root zone 130, the root DNS server 122 may, in response to a DNS query from the DNS resolver 116, sign one or more resource records containing the DNS answers to the DNS resolver 116 using the private ZSK key. In the event that the root DNS server 122 needs to delegate to the DNS server 124, the root DNS server 122 may request from the delegated DNS server 124, a designated signer (DS) record which contains cryptographic hashes of public KSK keys to be used by the DNS resolver 116 to verify the chain of trust. The KSK key pair for the delegated DNS server may be used to sign and verify the ZSK key pair of the DNS zone that delegated DNS server serves. In this way, a chain of trust may be established from the root zone to the zone that the delegated DNS server serves. The chain of trust may be recursively established all the way to the DNS zone that eventually provides the answer to the DNS query using the KSK and ZSK keys.

In an implementation, the DNS resolver 116 may resolve the chain of trust for the public key received from external DNS server 104 through the DNS hierarchy. In an implementation, the DNS resolver 116 may determine a security state of the DNS answer received from the external DNS server 104 in view of the chain of trust built from the root DNS zone or from any other configured trust anchor.

In the implementations of the DNSSEC, after the verification by the DNS resolver 116, the DNS answer is identified with a "Secure," "Insecure," "Bogus," or "Indeterminate" security state. The "Secure" state indicates that the DNS resolver 116 is able to verify a chain of trust from a trust anchor to the received public key for all the digital signatures of the DNS answer and that digital signatures match received DNS answer. The "Insecure" state indicates that the DNS resolver 116 is able to verify a chain of trust starting from a trust anchor and that this chain of trust contains a proof of non-existence of DS record at some delegation point (e.g., DS record was intentionally omitted by the administrator of the DNS zone supported by the delegated DNS server). As a result, the chain of trust ends prematurely before reaching DNS zone requested by the DNS resolver 116. The "Bogus" state indicates that the DNS resolver has a trust anchor and verified chain of trust through the DNS hierarchy indicating that the DNS answer is signed, but the signature cannot be verified for certain reasons (e.g., missing signatures, expired signatures, or wrong signatures). The "Bogus" state may indicate a possible spoof attack. The "Indeterminate" state indicates that there is no trust anchor that would indicate that a specific portion of the tree is secure. The "Indeterminate" state may mean that there is no trust anchor.

In one implementation of the present disclosure, in response to determining that the security state of the verification of a DNS answer by the DNS resolver 116 is "Secure," the DNS resolver 116 may accept the DNS answer from the external DNS server. In response to determining that the security state is "Insecure" or "Indeterminate," the DNS resolver 116 may re-generate and send the DNS query to the internal DNS server 118 and disable the DNSSEC validation feature for the DNS resolver 116. In one implementation, the DNSSEC validation is disabled only for the particular sub-domain (or zone) that is proven to be "Insecure" or "Indeterminate". In one implementation, the "Insecure" or "Indeterminate" state of a domain and the sub-tree associated with the domain may be cached with the DNS resolver so that any future query concerning the domain and the associated sub-tree may be sent to the internal DNS server directly. This may reduce the latency of DNS resolution. In response to determining that the security state is "Bogus," the DNS resolver 116 may notify the application requesting the domain name translation with a failure indicator and does not further query the internal DNS server. In this way, the system 100 returns DNSSEC-validated results if the DNS records are DNSSEC-signed, but does not allow spoofing of DNSSEC-signed results. Further, the system 100 allows for resolution of DNS queries about internal (or private) network domains. The system 100 does not require pre-configuring a list of domain exceptions, eliminating the DNS resolver's reliance on DHCP or the need to securely detect which network the client device 102 is connected to.

In one implementation, a list of domains, even if untrusted and possibly spoofed by an attacker can be stored and used as advisory information. For example, a list of untrusted domains may be set up in view of DHCP replies or domains pre-configured by the administrator of the company owning the client device. After the client device enters into a network, the client device may use the list. For example, this information indicates a domain is "Insecure" or "Indeterminate," the information may be used to pre-populate the DNS resolver cache in advance and used to direct queries to the domains on the list and their ancestors directly to the internal DNS server bypassing the external DNS server. This may improve the response time to DNS queries.

In one implementation, in addition to public top-level domains, the DNS system 100 may allow for private top-level domains (e.g., those .local, .internal, or .lan domains). These private top-level domains may be not secured because they are not DNSSEC-enabled, but may or may not have lower-level domains that are DNSSEC-enabled. In this way, queries may be directed to the internal DNS server. In one alternative implementation, the top-level domains are in the form of a preconfigured list of common private top-level domains (e.g., those .local, .internal, or .lan domains). This may afford additional protection against phishing attacks.

Figure 2:
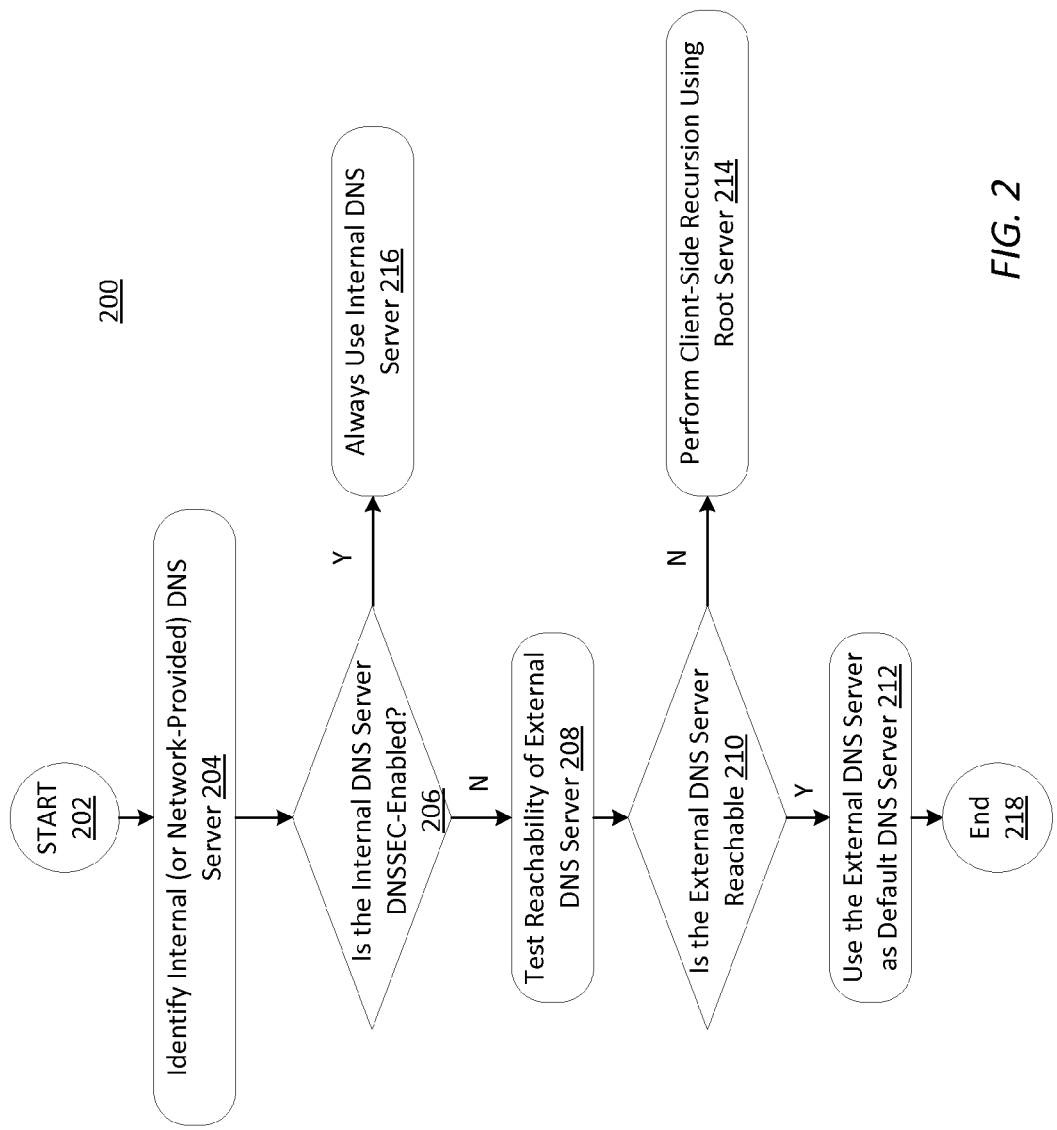
FIG. 2 is a flow diagram illustrating a method to identify the DNS servers according to some implementations of the present disclosure.

FIG. 2 is a flow diagram illustrating a method 200 to identify the DNS servers according to some implementations of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the DNS resolver 116 executed on the processing device 106 as shown in FIG. 1.

Referring to FIG. 2, at 202, the method to identify DNS servers for a client device may start. At 204, a processing of the client device may explore the local network to identify an internal DNS server. In one implementation, the internal DNS server may be designated by a system administrator. Therefore, the processing device may identify the internal DNS server according to certain configuration files of the client device. The internal DNS server may include the resource records of private domains within the local network. The internal DNS server may also include external domains and their corresponding IP addresses. The internal DNS server may have received the external domain data by pre-configuration and/or local cache of previously resolved domains. In one implementation, at 206, the processing device may further determine whether the internal DNS server is DNSSEC-enabled in view of whether internal DNS server is able to obtain and transmit resource record signatures and other DNSSEC meta data. At 216, if the internal DNS server is determined to be DNSSEC-enabled, the internal DNS server may be designated as the default DNS server to a DNS resolver.

However, if the internal DNS server is not DNSSEC-enabled, at 208, the processing device may further explore the external network to identify a reachable DNSSEC-enabled external DNS server. If there is no configured DNS server in the external network or none of the configured DNS servers are reachable, at 214, the processing device may use a root DNS server and appropriate public authoritative DNS servers of the external network as the default DNS server and may perform a full DNS server recursion as described above.

If the processing device is able to reach a configured DNSSEC-enabled external DNS server, at 212, the processing device may designate the external DNS server as the default DNS server. In one implementation, the default DNS server may be DNSSEC-enabled and may securely communicate with a DNS resolver of the client device. In one implementation, the processing device may stop searching for external DNS servers as soon as it identifies a DNSSEC-enabled DNS server, assuming that all external DNS servers are DNSSEC-enabled. Therefore, some of the external DNS servers within the hierarchy of the identified external DNS server may be without the DNSSEC capability.

Figure 3:
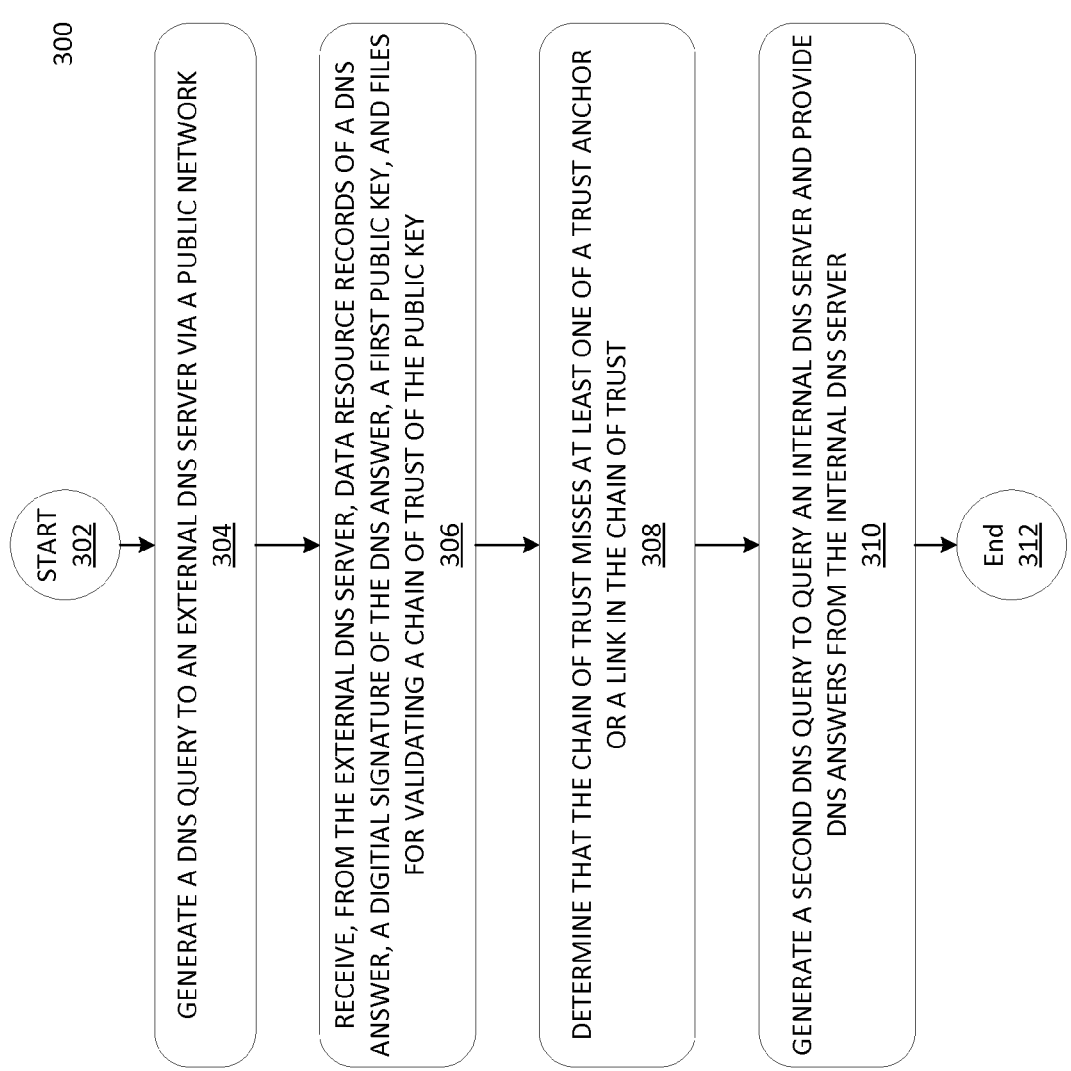
FIG. 3 is a flow diagram illustrating a method to validate DNS answers according to some implementations of the present disclosure.

FIG. 3 is a flow diagram illustrating a method 300 to validate DNS answers according to some implementations of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the DNS resolver 116 executed on the processing device 106 as shown in FIG. 1.

Referring to FIG. 3, the process to determine the security state of a DNS answer for a DNS query generated at a DNS resolver of a client device may start at 302. The DNS resolver may receive a DNS request for DNS service from an application being executed on a processing device of the client device. For example, a web browser application may request the IP address of a domain name. At 304, the DNS resolver of the client device may generate a DNS query including the request for DNS service and transmit the DNS query to an external DNS server that had been identified as DNSSEC-enabled as shown in FIG. 2.

The external DNS server may process the DNS query and generate a DNS answer including either the IP address of the domain name or the identity of a delegated external DNS server that may have the requested information. The external DNS server may be in a DNS zone that is secured by a private key and a matching public key (e.g., ZSK). In an implementation, the external DNS server may cryptographically sign the DNS answer with the private key of the DNS zone and the matching public key may be used for verification of the digital signature of the DNS answer. In an implementation, the external DNS server may also identify a delegated external DNS server serving a delegated DNS zone. For example, the external DNS server may be a root DNS server that may identify a delegated DNS server to provide the DNS answer. The external DNS server may store the DNS answer, digital signature of the DNS answer, and the public key of the DNS zone in resource records. Further, if needed, the DNS server may store the identity of the delegated DNS server in a first file and a public key of a key signing key (KS K) pair in a second file. The KSK public key may be used by the DNS resolver to verify the chain of trust for the public key of the DNS zone. The external DNS server may transmit resource records including the DNS answer, the digital signatures of the DNS answer, the public key of the DNS zone, and the first and second files to the DNS resolver of the client device.

At 306, the DNS resolver of the client device may receive the DNS answer, the digital signatures of the DNS answer, the signed public key of the DNS zone, and the first and second files to the DNS resolver of the client device from the external DNS server.

At 308, the DNS resolver of the client device may determine that the chain of the trust for the public key cannot trace to a trust anchor either because the trust anchor does not exist or a link in the chain of trust cannot be verified (corresponding to the "indeterminate" and "insecure" DNS-SEC states). A link of the chain of trust may be missing because one of the delegated DNS zone is not DNSSEC-enabled and does not have the capability to publish its public key in its parent DNS zone in the DNS hierarchy. In response to the determination, in an implementation, the client device may disable the DNSSEC capabilities of the DNS resolver of the client device and start using an internal DNS server.

At 310, the DNS resolver may generate a second DNS query including the DNS request to query the internal DNS server that is not DNSSEC-enabled. The DNS resolver may receive a DNS answer from the internal DNS server in the private network of the client device.

Figure 4:
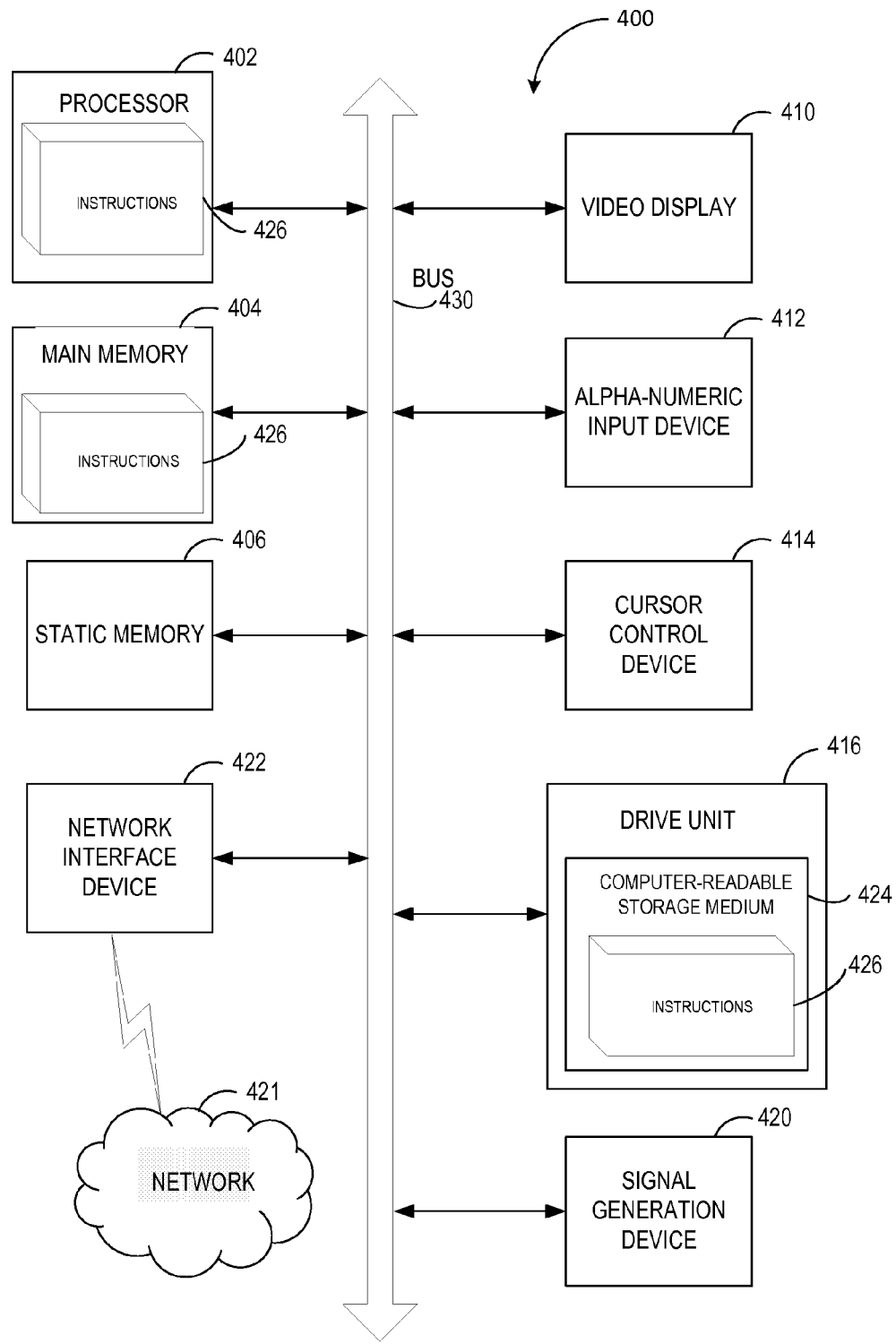
FIG. 4 is a block diagram illustrating an exemplary computer system, according to some implementations of the present disclosure.

FIG. 4 illustrates a diagrammatic representation of a machine in the exemplary form of a computer system 400 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., instructions of the DNS resolver 116). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 722.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing art to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "receiving", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system's memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   transmitting, by a processing device executing a domain name system (DNS) resolver, a first DNS query comprising a DNS request associated with an application to a first DNS server serving a first DNS zone connected to the processing device via a public network;
   receiving, from the first DNS server, a first resource record comprising a DNS answer to the DNS query, a second resource record comprising a digital signature generated by signing the DNS answer with a first private key of the first DNS zone, a third resource record comprising a first public key to verify the digital signature, and one or more files to validate a chain of trust of the first public key, wherein the one or more files comprise a first file comprising a name of a second DNS server delegated by the first DNS server serving a second DNS zone;
   determining, by the processing device in view of the one or more files, that the chain of trust of the first public key misses at least one of a trust anchor or a link in the chain of trust; and
   transmitting, by the DNS resolver, a second DNS query comprising the DNS request to a second DNS server residing in a private network of the processing device.

2. The method of claim 1, wherein the first DNS server and the DNS resolver are enabled with domain name system security extensions (DNSSEC), and the second DNS server is not enabled with the DNSSEC.

3. The method of claim 1, further comprising:
   in response to determining that the chain of trust of the first public key misses at least one of a trust anchor or a link in the chain of trust, disabling DNSSEC capability of the DNS resolver; and
   returning a result from the second DNS server to the application.

4. The method of claim 1, wherein the one or more files further comprise a second file comprising a second public key.

5. The method of claim 4, wherein the third resource record comprises the first public key is signed with a second private key, and wherein the second public key is capable of verifying the signed third resource record.

6. The method of claim 4, wherein determining that the chain of trust of the first public key misses the link comprises determining that the second file is missing.

7. The method of claim 4, wherein the trust anchor is a starting point of the chain of trust, and the trust anchor is obtained from a root DNS zone in a DNS hierarchy comprising the first and second DNS zones.

8. The method of claim 4, wherein the first private key and the first public key form a zone signing key pair for the first zone, and a second private key and the second public form a key signing key pair.

9. A non-transitory machine-readable storage medium storing instructions which, when executed, cause a processing device to:
   transmit, by the processing device executing a domain name system (DNS) resolver, a first DNS query comprising a DNS request associated with an application to a first DNS server serving a first DNS zone connected to the processing device via a public network;
   receive, from the first DNS server, a first resource record comprising a DNS answer to the DNS query, a second resource record comprising a digital signature generated by signing the DNS answer with a first private key of the first DNS zone, a third resource record comprising a first public key to verify the digital signature, and one or more files to validate a chain of trust of the first public key, wherein the one or more files comprise a first file comprising a name of a second DNS server delegated by the first DNS server serving a second DNS zone;

determine, by the processing device in view of the one or more files, that the chain of trust of the first public key misses at least one of a trust anchor or a link in the chain of trust; and transmit, by the DNS resolver, a second DNS query comprising the DNS request to a second DNS server residing in a private network of the processing device.

10. The machine-readable storage medium of claim 9, wherein the first DNS server and the DNS resolver are enabled with domain name system security extensions (DNSSEC), and the second DNS server is not enabled with the DNSSEC.

11. The machine-readable storage medium of claim 9, wherein the processing device is further to:

in response to determining that the chain of trust of the first public key misses at least one of a trust anchor or a link in the chain of trust, disable DNSSEC capability of the DNS resolver; and return a result from the second DNS server to the application.

12. The machine-readable storage medium of claim 9, wherein the one or more files further comprise a second file comprising a second public key.

13. The machine-readable storage medium of claim 12, wherein the third resource record comprises the first public key is signed with a second private key, and wherein the second public key is capable of verifying the signed third resource record.

14. The machine-readable storage medium of claim 12, wherein determining that the chain of trust of the first public key misses the link comprises determining that the second file is missing.

15. The machine-readable storage medium of claim 9, wherein the trust anchor is a starting point of the chain of trust, and the trust anchor is obtained from a root DNS zone in a DNS hierarchy comprising the first and second DNS zones.

16. A system, comprising:

a memory; and a processing device, communicatively coupled to the memory, to execute a domain name system (DNS) resolver to:

transmit a first DNS query comprising a DNS request associated with an application to a first DNS server serving a first DNS zone;

receive, from the first DNS server, a first resource record comprising a DNS answer to the DNS query, a second resource record comprising a digital signature generated by signing the DNS answer with a first private key of the first DNS zone, a third resource record comprising a first public key to verify the digital signature, and one or more files to validate a chain of trust of the first public key, wherein the one or more files comprise a first file comprising a name of a second DNS server delegated by the first DNS server serving a second DNS zone;

determine, in view of the one or more files, that the chain of trust of the first public key misses at least one of a trust anchor or a link in the chain of trust; and transmit a second DNS query comprising the DNS request to a second DNS server residing in a private network of the processing device.

17. The system of claim 16, wherein the first DNS server and the DNS resolver are enabled with domain name system security extensions (DNSSEC), and the second DNS server is not enabled with the DNSSEC.

18. The system of claim 16, wherein the one or more files further comprise a second file comprising a second public key.

19. The system of claim 18, wherein the third resource record comprises the first public key is signed with a second private key, and wherein the second public key is capable of verifying the signed third resource record.

20. The system of claim 18, wherein to determine that the chain of trust of the first public key misses the link, the processing device is to determine that the second file is missing.

* * * * *